United States Patent [19]

Miyakoshi et al.

[11] Patent Number: 5,118,754
[45] Date of Patent: Jun. 2, 1992

[54] CURABLE LIQUID SILICONE RUBBER COMPOSITIONS

[75] Inventors: Masanobu Miyakoshi, Annaka; Hironao Fujiki, Takasaki; Takeo Yoshida, Annaka, all of Japan

[73] Assignee: Shin-Etsu Chemical Co., Ltd., Tokyo, Japan

[21] Appl. No.: 549,089

[22] Filed: Jul. 6, 1990

[30] Foreign Application Priority Data

Jul. 7, 1989 [JP] Japan .................. 1-175949

[51] Int. Cl.⁵ .............................. C08K 5/24
[52] U.S. Cl. ................... 524/731; 524/730; 524/847; 524/862
[58] Field of Search ......... 524/847, 730, 731, 862

[56] References Cited

U.S. PATENT DOCUMENTS

| | | | |
|---|---|---|---|
| 3,445,420 | 5/1969 | Kookootsedes et al. | 260/37 |
| 3,532,649 | 10/1970 | Smith et al. | 260/18 |
| 3,957,717 | 5/1976 | Harada et al. | 524/862 |
| 4,196,173 | 4/1980 | Imai et al. | 524/862 |
| 4,360,610 | 11/1982 | Murray et al. | 523/212 |
| 4,427,801 | 1/1984 | Sweet | 524/862 |
| 4,695,597 | 9/1987 | Seino | 524/862 |
| 4,771,119 | 9/1988 | Wrobel | 524/862 |
| 4,965,295 | 10/1990 | Schwabe et al. | 524/862 |
| 5,006,580 | 4/1991 | Kasuya et al. | 524/731 |

FOREIGN PATENT DOCUMENTS

| | | |
|---|---|---|
| 38-26771 | 3/1963 | Japan . |
| 45-9476 | 4/1970 | Japan . |
| 62-41263 | 2/1987 | Japan . |
| 62-197457 | 9/1987 | Japan . |
| 63-150350 | 6/1988 | Japan . |

*Primary Examiner*—Melvyn I. Marquis
*Assistant Examiner*—Karen A. Hellender
*Attorney, Agent, or Firm*—Birch, Stewart, Kolasch & Birch

[57] ABSTRACT

A curable liquid silicone rubber composition comprising a diorganopolysiloxane having the general formula: $R^1_a SiO_{(4-a)/2}$ wherein $R^1$ is a substituted or unsubstituted monovalent hydrocarbon group and a ranges from 1.95 to 2.05, the diorganopolysiloxane containing at least two lower alkenyl groups attached to a silicon atom per molecule, an organohydrogenpolysiloxane containing at least two hydrogen atoms attached to silicon atoms per molecule, finely divided silica, and a platinum catalyst is improved in fatigue resistance by blending a specific cyclic or linear diorganopolysiloxane.

5 Claims, No Drawings

CURABLE LIQUID SILICONE RUBBER COMPOSITIONS

This invention relates to curable liquid silicone rubber compositions of the addition reaction type curing into products having improved fatigue resistance.

BACKGROUND OF THE INVENTION

In the prior art, liquid silicone rubber compositions of the addition reaction curing type are regarded as being useful for the manufacture of medical parts including valve gaskets and nipples because of their advantages in moldability and toxicity as compared with silicone rubber compositions of the peroxide curing type known as millable type. Since they are less satisfactory in flexural resistance, extension resistance, and other fatigue resistance properties requisite for such applications, there is a need for further improvements from practical aspects.

A variety of techniques are known for improving the fatigue resistance of silicone rubber compositions, particularly millable silicone rubber compositions. For example, it is useful to blend a linear organohydrogenpolysiloxane having locally concentrated vinyl groups in raw rubber compositions as disclosed in Japanese Patent Application Kokai No. 197457/1987, to add an organic phosphate salt or titanate coupling agent as disclosed in Japanese Patent Application Kokai No. 41263/1987, and to use a blending co-agent in the form of a copolymer of dimethylsiloxane and 3,3,3-trifluoropropylmethylsiloxane as disclosed in Japanese Patent Application Kokai No. 150350/1988.

If such techniques are applied to liquid silicone rubber compositions of the addition reaction curing type, curing inhibition and a considerable loss of flow occur. The techniques are ineffective for these compositions, which are thus difficult to improve fatigue resistance properties.

U.S. Pat. No. 4,360,610 discloses that a silicone rubber having improved tensile strength is obtained by adding a hydroxylated vinyl group-containing organo silicon compound in two increments to a mixture of a polydiorganosiloxane gum and an untreated reinforcing filler and curing the resulting compound with an organic peroxide. However, this silicone rubber composition relies on an organic peroxide curing system. The fatigue resistance of the composition is described nowhere.

There is a need for developing a technique for improving the fatigue resistance of liquid silicone rubber compositions of the addition reaction curing type.

SUMMARY OF THE INVENTION

An object of the present invention is to provide a novel and improved curable liquid silicone rubber composition of quality which cures into a product having high fatigue resistance.

According to the present invention, there is provided a curable liquid silicone rubber composition comprising in admixture, (1) a diorganopolysiloxane having the general formula:

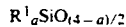

$$R^1_a SiO_{(4-a)/2} \quad (I)$$

wherein $R^1$ is a substituted or unsubstituted monovalent hydrocarbon group having 1 to 10 carbon atoms and letter a is a positive number in the range of from 1.95 to 2.05, said diorganopolysiloxane containing at least two lower alkenyl groups attached to a silicon atom per molecule and having a viscosity of 300 to 300,000 centistokes at 25° C., (2) an organohydrogenpolysiloxane containing at least two hydrogen atoms attached to silicon atoms per molecule.

(3) finely divided silica having a specific surface area of at least 100 m²/g.

(4) an organopolysiloxane selected from the class consisting of (4-1) a cyclic diorganopolysiloxane having the general formula:

wherein $R^2$ and $R^3$ are independently selected from the class consisting of a substituted or unsubstituted monovalent hydrocarbon group having 1 to 10 carbon atoms and a hydroxyl group, said cyclic diorganopolysiloxane containing at least one vinyl group and at least one hydroxyl group per molecule, and (4-2) a linear diorganopolysiloxane containing at least one silanol group and on average, one vinyl group attached to a silicon atom per molecule, the remaining organic group being a substituted or unsubstituted monovalent hydrocarbon group having 1 to 10 carbon atoms other than an unsaturated aliphatic hydrocarbon group, said linear diorganopolysiloxane having an average degree of polymerization of 4 to 50, and (5) platinum or a platinum compound. This curable liquid silicone rubber composition is of the addition reaction curing type and cures into a product having improved fatigue resistance properties including flexural resistance and extension resistance.

For improving the fatigue properties of a curable liquid silicone rubber composition, it is necessary to increase the strength of a cured product thereof or silicone rubber. For the reinforcement, it is preferred to use a reinforcing filler in the form of extremely fine powder silica having a specific surface area of at least 100 m²/g, for example, fumed silica and precipitated silica. Although extremely fine powder silica generally creates nuclei of breaking fatigue endurance, adversely affecting the service life of silicone rubber, the fatigue resistance of silicone rubber can be improved by blending a cyclic or linear diorganopolysiloxane along with fine powder silica.

DETAILED DESCRIPTION OF THE INVENTION

The first component of the present composition is a diorganopolysiloxane which is represented by the general formula (I):

$$R^1_a SiO_{(4-a)/2} \quad (I)$$

wherein $R^1$ is a substituted or unsubstituted monovalent hydrocarbon group having 1 to 10 carbon atoms, preferably 1 to 8 carbon atoms and letter a is a positive number in the range of from 1.95 to 2.05 and which contains at least two lower alkenyl groups attached to a silicon atom per molecule. This diorganopolysiloxane forms a base polymer of the composition.

The substituent $R^1$ includes lower alkenyl groups attached to a silicon atom, for example, alkenyl groups having 2 to 4 carbon atoms, such as vinyl, allyl, propenyl, and butenyl groups, with the vinyl group being preferred. Other $R^1$ groups attached to a silicon atom include alkyl groups having 1 to 8 carbon atoms, such as methyl, ethyl, propyl, and butyl groups; aryl groups having 6 to 10 carbon atoms such as phenyl and tolyl groups; aralkyl groups having 7 to 10 carbon atoms such as benzyl and 2-phenylethyl groups; and substituted monovalent hydrocarbon groups having some or all of the hydrogen atoms replaced by halogen atoms or the like, for example, substituted alkyl groups having 1 to 8 carbon atoms such as chloromethyl and 3,3,3-trifluoropropyl groups.

It would be understood that the lower alkenyl groups attached to a silicon atom may be present at either an intermediate or an end of a molecular chain. The $R^1$ groups other than the lower alkenyl group, if any, in a molecule, may be of the same type or a mixture of different types.

It is preferred that the diorganopolysiloxane of formula (I) predominantly has a linear molecular structure because the end product is an elastomer. However, the diorganopolysiloxane of formula (I) may partially contain a branched molecular structure. A homopolymer, a copolymer, and mixtures of a homopolymer and a copolymer are included.

The diorganopolysiloxane of formula (I) has a viscosity of 300 to 300,000 centistokes (cSt) at 25° C., preferably 500 to 100,000 centistokes at 25° C. A viscosity of less than 300 cSt results in a cured product having low elasticity whereas a viscosity of more than 300,000 cSt results in a heavily viscous silicone rubber composition which is difficult to handle.

Examples of the diorganopolysiloxane of formula (I) are shown below for illustration purposes and not for limiting. They may be synthesized by conventional well known methods. In the following structural formulae, l and m are integers and the sum of l and m ranges from 50 to 3,000, preferably 100 to 1,500.

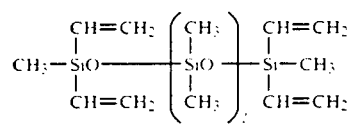

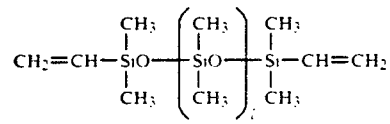

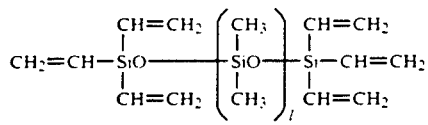

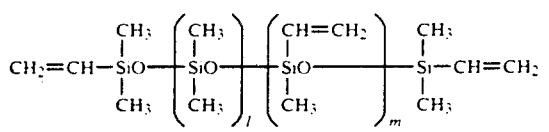

-continued

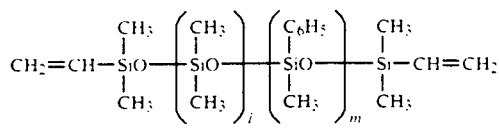

The second component of the present composition is an organohydrogenpolysiloxane containing at least two hydrogen atoms attached to silicon atoms per molecule. It is typically of the general formula:

$$R^4_b H_c SiO_{(4-b-c)/2}$$

wherein $R^4$ is a substituted or unsubstituted hydrocarbon group having 1 to 10 carbon atoms as previously defined for $R^1$, letters b and c are positive integers and the sum of b+c is from 1.0 to 3.0. The substituent $R^4$ is preferably an alkyl group such as a methyl, ethyl, propyl or butyl group, an aryl group such as a phenyl or tolyl group, or a substituted one such as a 3,3,3-trifluoropropyl group, but preferably alkenyl groups are excluded from $R^4$. The organohydrogenpolysiloxane as the second component which contains at least two silicon-to-hydrogen bonds ($\equiv$Si—H) capable of reacting with alkenyl groups in the first component preferably has a degree of polymerization of up to 300.

The groups attached to a silicon atom in the organohydrogenpolysiloxane molecule other than the hydrogen atom may be monovalent organic groups having 1 to 10 carbon atoms, preferably having 1 to 8 carbon atoms, including alkyl groups having 1 to 8 carbon atoms, such as methyl, ethyl, propyl, and butyl groups; aryl groups having 6 to 10 carbon atoms such as phenyl and tolyl groups; aralkyl groups having 7 to 10 carbon atoms such as benzyl and 2-phenylethyl groups; and substituted monovalent hydrocarbon groups having some or all of the hydrogen atoms replaced by halogen atoms or the like, for example, substituted alkyl groups having 1 to 8 carbon atoms such as chloromethyl and 3,3,3-trifluoropropyl groups. The organic groups of the same type or a mixture of different types may be present in a molecule.

The position of a silicon atom to which the hydrogen atom is attached is not particularly limited. The hydrogen atom may be present at either an intermediate or an end of a molecular chain.

The organohydrogenpolysiloxane may have any of linear, branched, cyclic, and network molecular structures. A homopolymer, a copolymer, and mixtures of a homopolymer and a copolymer are included.

Examples of the organohydrogenpolysiloxane are shown below for illustration purposes and not for limiting. They may be synthesized by conventional well-known methods.

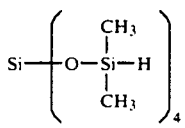

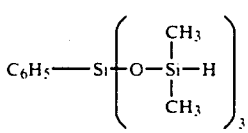

-continued

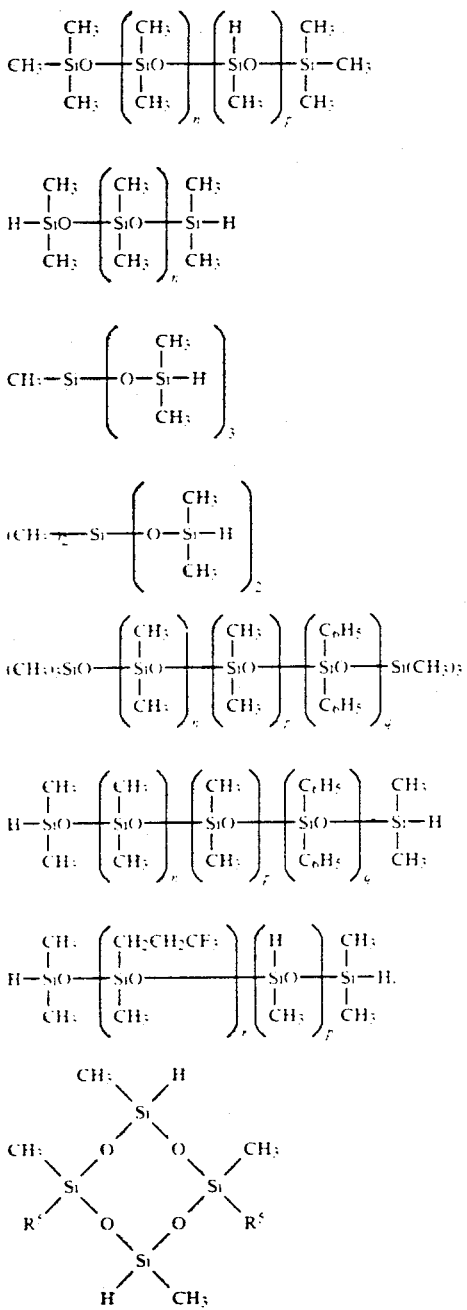

In the above structural formulae, n, p, q and r are integers, with n≧0, p≧2, q≧0, and r≧0, preferably each of n, n+p, n+p+q, and r+q is from 4 to 300; s and t are positive numbers and the sum of s+t is 1; and $R^5$ is hydrogen, a monovalent hydrocarbon group having 1 to 8 carbon atoms such as an alkyl and aryl group, or a triorganosiloxy group such as a trimethylsiloxy group.

The second component or organohydrogenpolysiloxane is desirably added in such an amount as to provide 0.5 to 4, especially 1 to 2 hydrogen atoms attached to a silicon atom per one of the alkenyl groups present in the overall composition. With a lesser amount of organohydrogenpolysiloxane, the composition would sometimes become deficient upon curing. A larger amount of organohydrogenpolysiloxane would result in an unsatisfactory cured product as by causing the composition to foam.

If the second component is a difunctional organohydrogenpolysiloxane, it is preferred to use a mixture of a difunctional organohydrogenpolysiloxane and a trifunctional or polyfunctional organohydrogenpolysiloxane or to use a trifunctional or polyfunctional alkenyl group-containing diorganopolysiloxane as the first component.

The third component is finely divided silica which is used for the purpose of imparting hardness and strength to the composition. The finely divided silica has a specific surface area of at least 100 m²/g, preferably 100 to 400 m²/g as measured by the BET method. Silica having a specific surface area of less than 100 m²/g can reinforce the composition to some extent, but fails to impart fatigue resistance.

Examples of the finely divided silica are fumed silica and precipitated silica. Although these silicas may be used independent of whether they have been surface treated to be hydrophobic, fumed silica whose surface has been rendered hydrophobic is preferred. When the hydrophobic surface treatment of silica filler is desired, the silica which has been surface treated with silane, siloxane or a similar agent to be hydrophobic may be used. Alternatively, silica powder may be wetted with silazane, siloxane or a similar agent when it is blended in the composition.

The silica fine powder is preferably blended in an amount of 10 to 50 parts, more preferably 15 to 40 parts by weight per 100 parts by weight of the first component. Less than 10 parts by weight of silica powder would sometimes result in a cured product having less desirable strength or fatigue resistance whereas more than 50 parts by weight of silica powder would sometimes result in a composition which is too viscous to handle as a liquid compound and experiences a loss of fatigue resistance.

The fourth component is a fatigue endurance modifier added especially for controlling the interface of the third component or silica powder. It is a cyclic or linear diorganopolysiloxane as defined below.

The cyclic diorganopolysiloxane used as the fourth component has the general formula:

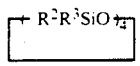 (II)

and contains at least one vinyl group and at least one hydroxyl group per molecule. In formula (II), $R^2$ and $R^3$ are independently selected from the class consisting of a substituted or unsubstituted monovalent hydrocarbon group having 1 to 10 carbon atoms, preferably 1 to 8 carbon atoms and a hydroxyl group. In addition to the vinyl and hydroxyl groups, the groups represented by $R^2$ and $R^3$ include alkyl groups having 1 to 8 carbon atoms, such as methyl, ethyl, propyl, and butyl groups; alkenyl groups having 3 to 4 carbon atoms, such as allyl and propenyl groups; aralkyl groups having 7 to 10 carbon atoms such as benzyl and 2-phenylethyl groups; aryl groups having 6 to 10 carbon atoms such as phenyl and tolyl groups; and substituted monovalent hydrocarbon groups having some or all of the hydrogen atoms replaced by halogen atoms or the like, for example, substituted alkyl groups having 1 to 8 carbon atoms such as chloromethyl and 3,3,3-trifluoropropyl groups. The hydrocarbon groups of the same type or a mixture of different types may be present in a molecule.

Examples of the cyclic diorganopolysiloxane are shown below for illustration purposes and not for limiting. They may be synthesized by conventional well-known methods.

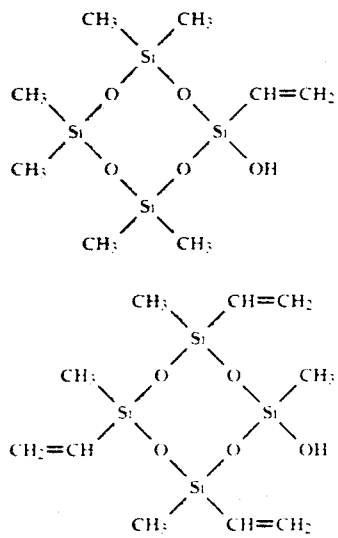

The cyclic diorganopolysiloxane of formula (II) is preferably blended in an amount of 0.1 to 20 parts, more preferably 1 to 10 parts by weight per 100 parts by weight of the first component. Amounts of less than 0.1 part are often insufficient to improve fatigue endurance whereas amounts of more than 20 parts would often prevent smooth curing of the composition, resulting in unacceptable cured products.

Alternatively, the fourth component is a linear diorganopolysiloxane containing at least one silanol group and on average, one vinyl group attached to a silicon atom per molecule, the remaining organic group or groups being substituted or unsubstituted monovalent hydrocarbon groups having 1 to 10 carbon atoms, preferably 1 to 8 carbon atoms as previously defined for $R^2$ and $R^3$, other than unsaturated aliphatic hydrocarbon groups.

It is essential that the linear diorganopolysiloxane contain at least one silanol group and on average, one vinyl group attached to a silicon atom per molecule. If it contains two or more vinyl groups on average, it fails to impart fatigue endurance.

The organic groups other than the vinyl group may be monovalent hydrocarbon groups such as methyl, ethyl, 3,3,3-trifluoropropyl, and phenyl groups, and substituted hydrocarbon groups in which some or all of the hydrogen atoms attached to carbon are replaced by other radicals, with the methyl group being most preferred.

The linear diorganopolysiloxane has an average degree of polymerization of 4 to 50, preferably 10 to 40. An average degree of polymerization outside this range fails to impart fatigue endurance.

A typical example of the linear diorganopolysiloxane is shown below.

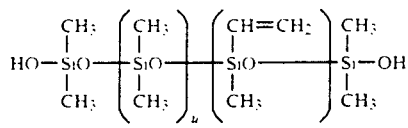

In this structural formula, u is an integer of 1 to 47.

The linear diorganopolysiloxane is preferably blended in an amount of 1 to 20 parts, more preferably 2 to 15 parts by weight per 100 parts by weight of the first component. Compositions containing less than 1 part or more than 20 parts of the linear diorganopolysiloxane would fail to form cured products having fatigue endurance.

The cyclic or linear diorganopolysiloxane as the fourth component may be added to the composition in any desired manner at the same time as or after the filler is blended. The use of a mixture of cyclic and linear diorganopolysiloxanes is also contemplated.

The fifth component is a catalyst for the present composition, which is platinum or a platinum compound as commonly used in conventional silicone rubber compositions of the addition curing type.

The platinum and platinum compounds used herein include platinum black, solid platinum on alumina, silica, and other supports, chloroplatinic acid, alcohol-modified chloroplatinic acid, complexes of chloroplatinic acid and olefins, and complexes of platinum and vinylsiloxanes. On use, it is preferred for dispersion to finely divide the catalyst or to use a particulate support having a reduced particle size and an increased specific surface area if the catalyst is solid. If the catalyst is chloroplatinic acid or a complex of chloroplatinic acid and an olefin, it may be dissolved in alcohol, ketone, ether, and hydrocarbon solvents.

The platinum or platinum compound is used in a catalytic amount. The amount of platinum or platinum compound added may be adjusted so as to achieve the desired curing rate. The catalytic amount which meets the economy and ensures satisfactory cured products is in the range of 1 to 30 parts per million parts by weight of the first component for chloroplatinic acid and similar catalysts which are compatible with siloxane, and 20 to 500 parts per million parts by weight of the first component for platinum black and other solid catalysts.

The composition of the present invention may further contain various additives if desired. For the purpose of enhancing the strength of a cured composition available as an elastomer, there may be added an organopolysiloxane having a resin structure comprising an $SiO_2$ unit and a $CH_2=CH(R)_2SiO_{\frac{1}{2}}$ unit wherein R is a monovalent hydrocarbon group free of an aliphatic unsaturated double bond as disclosed in Japanese Patent Publication Nos. 26771/1963 and 9476/1970. For the purpose of controlling the curing rate of a composition, there may be added a cyclic siloxane of the formula:

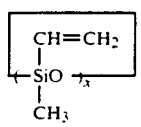

wherein x is 4 to 6, an acetylene compound as disclosed in U.S. Pat. No. 3,445,420, or an ionic compound of a heavy metal as disclosed in U.S. Pat. No. 3,532,649.

Further for the purpose of improving flexibility and mold releasability, there may be added a suitable amount of a non-functional organopolysiloxane.

Furthermore, fillers may be added to the composition of the invention for the purposes of reducing thermal shrinkage upon curing, and reducing the coefficient of thermal expansion, improving the thermal stability, weatherability, chemical resistance, flame retardancy, or mechanical strength, or reducing the gas permeability of an elastomer obtained after curing. Examples include quartz powder, glass fibers, carbon, metal oxides (e.g., cerium oxide, iron oxide, and titanium oxide), and metal carbonates (e.g., calcium carbonate and magnesium carbonate). Pigments, dyes, and antioxidants may also be added if desired.

On use of the present composition, it may be diluted (e.g., dissolved or dispersed) with a suitable solvent such as toluene, xylene, and halide solvents to a desired concentration depending on a particular application and purpose.

The composition of the invention is obtained simply by mixing the first to fifth components. The order of addition of the respective components is not critical. One exemplary process includes the steps of previously forming a mixture of all the components except the second component and blending the mixture with the second component upon use. When it is desired to mold the composition through a liquid injection molding machine, a first premix (A) of the first, third, fourth, and fifth components and a second premix (B) of the first, second, third, and fourth components may be blended together upon use. A heat treatment is preferably involved during the preparation of such a premix. In this embodiment, the first and third components or the first, third, and fourth components are mixed while heating them. The heat treatment is generally carried out at a temperature of 100° to 180° C. The introduction of such a heat treatment during mixing results in a composition having more stable properties including fatigue endurance and viscosity increase with time.

The composition of the invention is cured by allowing it to stand at room temperature after mixing the components. Preferably, the composition is heated to promote curing. Most often, the composition is cured by heating to a temperature of at least 100° C., typically at about 120° C. for 20 to 90 seconds.

As understood from the foregoing description, the invention provides a curable liquid silicone rubber composition of the addition reaction curing type which cures into a product having improved fatigue resistant properties. As compared with conventional millable silicone rubber compositions of the peroxide curing type, the present composition has the following advantages.

(1) It produces no reaction by-products, no toxicity to humane bodies, and little change in outer appearance.

(2) It can be cured over a wide range of temperature. That is, it can be cured at room temperature or briefly cured by heating if necessary.

(3) It can be molded through a liquid injection molding machine. The closed system molding eliminates accidental introduction of foreign matter. It can be integrally molded over inserts of various plastic materials by low-pressure molding and low-temperature short-time curing. Since the curing reaction is of the addition reaction type, it is not affected by air inhibition so that open areas such as fins may be thoroughly cured, ensuring continuous or automatic molding.

The composition of the invention is advantageously used in a wide variety of applications, for example, as medical parts which undergo repetitive deformation, such as valve gaskets and nipples.

EXAMPLE

Examples of the present invention are given below by way of illustration and not by way of limitation. All parts and percents are by weight unless otherwise stated. The viscosity is a value in centistoke (cSt) as measured at 25° C.

EXAMPLE 1

To 70 parts of a diorganopolysiloxane of formula (1) having a viscosity of about 15,000 cSt and 60 parts of a diorganopolysiloxane of formula (2) having a viscosity of about 100,000 cSt as the first component were added 47 parts of fumed silica surface treated with hexamethyldisilazane having a specific surface area of 200 m²/g as the third component and 2 parts of a cyclic diorganopolysiloxane of formula (3) having a viscosity of about 80 cSt as the fourth component.

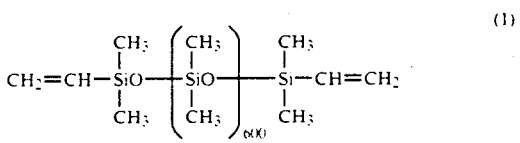

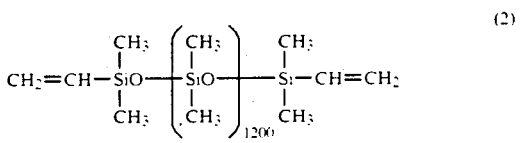

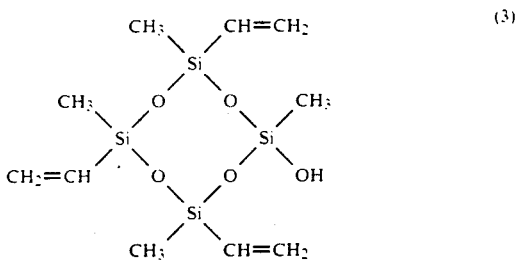

These ingredients were evenly mixed in a kneader, masticated for 4 hours while heating at 150° C., then cooled down, and milled in a three-roll mill to form a homogeneous mixture.

A composition (A) was prepared by adding 0.05 parts of a 2-ethylhexanol solution of chloroplatinic acid (platinum concentration 2%) as the fifth component and 17 parts of the diorganopolysiloxane of formula (2) to 179 parts of the mixture and uniformly mixing them.

Also, a composition (B) was prepared by adding 13.6 parts of an organohydrogenpolysiloxane of formula (4) having a viscosity of about 10 cSt as the second component and 3 parts of the diorganopolysiloxane of formula (2) to 179 parts of the mixture and uniformly mixing them.

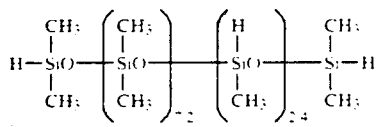

(4)

EXAMPLE 2

A mixture was prepared by the same procedure as in Example 1 except that the cyclic diorganopolysiloxane of formula (3) was replaced by 5 parts of a cyclic diorganopolysiloxane of formula (5) having a viscosity of about 50 cSt.

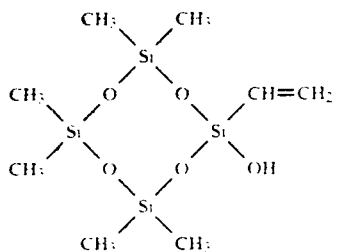

(5)

A composition (A) was prepared by adding 0.1 part of a 2-ethylhexanol solution of chloroplatinic acid (platinum concentration 2%) as the fifth component and 14 parts of the diorganopolysiloxane of formula (2) to 182 parts of the mixture and uniformly mixing them.

Also, a composition (B) was prepared by adding 5.5 parts of an organohydrogenpolysiloxane of formula (6) having a viscosity of about 800 cSt and 2.4 parts of an organohydrogenpolysiloxane of formula (7) having a viscosity of about 20 cSt as the second component, 0.02 parts of ethynylcyclohexanol as a cure speed modifier, and 6 parts of the diorganopolysiloxane of formula (2) to 182 parts of the mixture and uniformly mixing them.

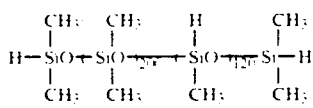

(6)

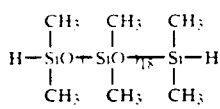

(7)

EXAMPLE 3

As described in Example 1, a mixture was prepared by blending 130 parts of a diorganopolysiloxane of formula (8) having a viscosity of about 30,000 cSt as the first component, 47 parts of fumed silica having a specific surface area of 200 m$^2$/g as the third component, 3 parts of hexamethyldisilazane as a surface treating agent for the silica, and 10 parts of the cyclic diorganopolysiloxane of formula (5).

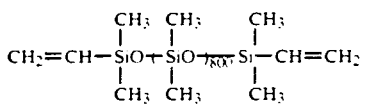

(8)

A composition (A) was prepared by adding 0.15 parts of a 2-ethylhexanol solution of chloroplatinic acid (platinum concentration 2%) as the fifth component and 11 parts of the diorganopolysiloxane of formula (2) to 185 parts of the mixture and uniformly mixing them.

Also, a composition (B) was prepared by adding 1 part of the diorganopolysiloxane of formula (2), 0.13 parts of ethynylcyclohexanol as a cure speed modifier, 1.6 parts of the organohydrogenpolysiloxane of formula (6), and 8.5 parts of the organohydrogenpolysiloxane of formula (7) to 185 parts of the mixture and uniformly mixing them.

COMPARATIVE EXAMPLE 1

A mixture was prepared by the same procedure as in Example 1 except that the cyclic diorganopolysiloxane of formula (3) as the fourth component was omitted.

A composition (A) was prepared by adding 0.1 part of a 2-ethylhexanol solution of chloroplatinic acid (platinum concentration 2%) and 14 parts of the diorganopolysiloxane of formula (2) to 177 parts of the mixture and uniformly mixing them.

Also, a composition (B) was prepared by adding 3.5 parts of the organohydrogenpolysiloxane of formula (6), 4 parts of the organohydrogenpolysiloxane of formula (7), 0.18 parts of ethynylcyclohexanol as a cure speed modifier, and 6 parts of the diorganopolysiloxane of formula (2) to 177 parts of the mixture and uniformly mixing them.

EXAMPLE 4

To 70 parts of the diorganopolysiloxane of formula (1) and 60 parts of a diorganopolysiloxane of formula (2) having a viscosity of about 100,000 cSt as the first component were added 47 parts of fumed silica surface treated with hexamethyldisilazane having a specific surface area of 200 m$^2$/g as the third component and 5 parts of a linear diorganopolysiloxane of formula (9) having a viscosity of about 20 cSt as the fourth component.

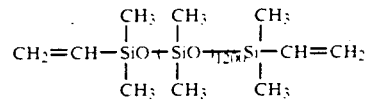

(2)

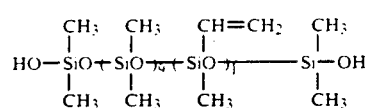

(9)

These ingredients were evenly mixed in a kneader, masticated for 4 hours while heating at 150° C., then cooled down, and milled in a three-roll mill to form a homogeneous mixture.

A composition (A) was prepared by adding 14 parts of the diorganopolysiloxane of formula (2) and 0.05 parts of a 2-ethylhexanol solution of chloroplatinic acid (platinum concentration 2%) as the fifth component to 182 parts of the mixture and uniformly mixing them.

Also, a composition (B) was prepared by adding 6 parts of the diorganopolysiloxane of formula (2), 0.35 parts of ethynylcyclohexanol as a cure speed modifier, and 4.3 parts of the organohydrogenpolysiloxane of formula (6) and 9.3 parts of the organohydrogenpolysiloxane of formula (7) as the second component to 182 parts of the mixture and uniformly mixing them.

EXAMPLE 5

A mixture was prepared by the same procedure as in Example 4 except that the diorganopolysiloxane of formula (8) was used as the first component and a linear diorganopolysiloxane of formula (10) having a viscosity of about 50 cSt was used as the fourth component.

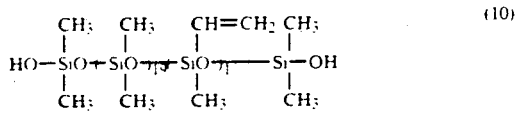

A composition (A) was prepared by adding 11 parts of the diorganopolysiloxane of formula (2) and 0.15 parts of a 2-ethylhexanol solution of chloroplatinic acid (platinum concentration 2%) as the fifth component to 182 parts of the mixture and uniformly mixing them.

Also, a composition (B) was prepared by adding 1 part of the diorganopolysiloxane of formula (2), 0.13 parts of ethynylcyclohexanol as a cure speed modifier, 1.6 parts of the organohydrogenpolysiloxane of formula (6), and 8.5 parts of the organohydrogenpolysiloxane of formula (7) to 182 parts of the mixture and uniformly mixing them.

EXAMPLE 6

A mixture was prepared by the same procedure as in Example 4 except that 130 parts of a diorganopolysiloxane of formula (11) having a viscosity of about 100,000 cSt was used as the first component.

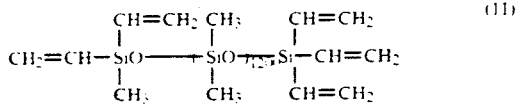

A composition (A) was prepared by adding 4 parts of the diorganopolysiloxane of formula (11), 20 parts of the diorganopolysiloxane of formula (12) having a viscosity of about 700 cSt, and 0.15 parts of a 2-ethylhexanol solution of chloroplatinic acid (platinum concentration 2%) as the fifth component to 182 parts of the mixture and uniformly mixing them.

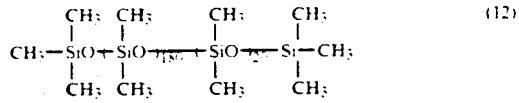

Also, a composition (B) was prepared by adding 8 parts of the diorganopolysiloxane of formula (11), 0.05 parts of ethynylcyclohexanol as a cure speed modifier, and 17 parts of an organohydrogenpolysiloxane of formula (13) having a viscosity of about 8 cSt as the second component to 182 parts of the mixture and uniformly mixing them.

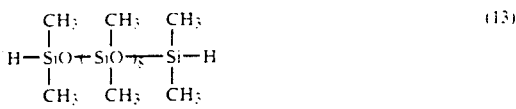

COMPARATIVE EXAMPLE 2

A mixture was prepared by the same procedure as in Example 4 except that the linear diorganopolysiloxane of formula (9) as the fourth component was omitted.

A composition (A) was prepared by adding 14 parts of the diorganopolysiloxane of formula (2) and 0.2 parts of a 2-ethylhexanol solution of chloroplatinic acid (platinum concentration 2%) as the fifth component to 177 parts of the mixture and uniformly mixing them.

Also, a composition (B) was prepared by adding 6 parts of the diorganopolysiloxane of formula (2), 0.18 parts of ethynylcyclohexanol as a cure speed modifier, 3.5 parts of the organohydrogenpolysiloxane of formula (6), and 4.0 parts of the organohydrogenpolysiloxane of formula (7) to 177 parts of the mixture and uniformly mixing them.

Compositions (A) and (B) obtained in each of Examples 1–6 and Comparative Examples 1–2 were supplied to a liquid injection molding machine (Sanjo Seiki K.K.) at a mixing ratio (A)/(B) of 1/1. A sheet of 150 × 150 × 2 mm thick was injection molded by operating the machine under conditions: an injection pressure of 90 kg/cm$^2$, an injection time of 5 seconds, a temperature of 150° C., and a holding time of 40 seconds. The sheet was post cured for one hour at 150° C. and then measured for physical properties by a method according to JIS K-6301. The physical properties measured include specific gravity (SG) at 25° C., hardness, tensile strength in kgf/cm$^2$, elongation in %, and tear strength in kgf/cm.

A No. 3 dumbbell specimen was punched out of each sheet. It was set in a de Mattia machine (Toyo Seiki K.K.) according to JIS K-6301 by which the clamp was moved up and down to produce reciprocating motion to 100% elongation at a frequency of 300 strokes per minute (that is, the specimen was repeatedly expanded between 0% and 100%) until the specimen was broken. The number of strokes until the specimen breakage was a measure of constant elongation fatigue.

Compositions (A) and (B) were measured for viscosity by means of a BS type rotational viscometer with a No. 7 rotor at 10 r.p.m. according to JIS K-6833.

The results are shown in Table 1.

As is evident from Table 1, the curable liquid silicone rubber compositions of the invention are improved in fatigue resistance over the comparative compositions which lack the fourth component.

Several preferred embodiments have been described. Obviously many modifications and variations of the present invention are possible in the light of the above teachings. It is therefore to be understood that within the scope of the appended claims, the invention may be practiced otherwise than as specifically described.

TABLE 1

|  | E1 | E2 | E3 | CE1 | E4 | E5 | E6 | CE2 |
|---|---|---|---|---|---|---|---|---|
| Appearance |  |  |  |  |  |  |  |  |
| Composition (A) | st | st | st | st | st | st | st | st |
| Composition (B) | st | st | st | st | st | st | st | st |
| Viscosity |  |  |  |  |  |  |  |  |
| Composition (A) | 5500 | 6500 | 13000 | 6000 | 7000 | 10000 | 15000 | 6000 |

TABLE 1-continued

| | E1 | E2 | E3 | CE1 | E4 | E5 | E6 | CE2 |
|---|---|---|---|---|---|---|---|---|
| Composition (B) | 5000 | 6000 | 9000 | 6000 | 6000 | 9000 | 13000 | 6000 |
| Specific gravity | 1.11 | 1.11 | 1.11 | 1.11 | 1.10 | 1.11 | 1.10 | 1.11 |
| Hardness (JIS A) | 31 | 29 | 30 | 30 | 29 | 30 | 30 | 30 |
| Tensile strength, kgf/cm² | 105 | 120 | 92 | 95 | 85 | 90 | 90 | 85 |
| Elongation, % | 980 | 970 | 1200 | 900 | 1100 | 1100 | 1050 | 950 |
| Tear strength, kgf/cm, JIS A | 39 | 45 | 35 | 40 | 35 | 30 | 31 | 30 |
| Tear strength, kgf/cm, JIS B | 30 | 30 | 27 | 30 | 30 | 25 | 32 | 30 |
| 100% elongation fatigue, ·10⁴ strokes | 1150 | 650 | 980 | 200 | 880 | 1100 | 700 | 230 | st = semitransparent

We claim:

1. A curable liquid silicone rubber composition comprising in admixture,
   (1) a diorganopolysiloxane having the general formula:

$$R^1_aSiO_{(4-a)/2} \quad (I)$$

wherein $R^1$ is a substituted or unsubstituted monovalent hydrocarbon group having 1 to 10 carbon atoms and letter a is a positive number in the range of from 1.95 to 2.05, said diorganopolysiloxane containing at least two lower alkenyl groups attached to a silicon atom per molecule and having a viscosity of 300 to 300,000 centistokes at 25° C.,
   (2) an organohydrogenpolysiloxane containing at least two hydrogen atoms attached to silicon atoms per molecule,
   (3) finely divided silica having a specific surface area of at least 100 m²/g,
   (4) an organopolysiloxane selected from the class consisting of
      (4-1) a cyclic diorganopolysiloxane having the general formula:

$$[R^2R^3SiO]_n \quad (II)$$

wherein $R^2$ and $R^3$ are independently selected from the class consisting of a substituted or unsubstituted monovalent hydrocarbon group having 1 to 10 carbon atoms and a hydroxyl group, said cyclic diorganopolysiloxane containing at least one vinyl group and at least one hydroxyl group per molecule, and
      (4-2) a linear diorganopolysiloxane containing at least one silanol group and on average, one vinyl group attached to a silicon atom per molecule, the remaining organic group being a substituted or unsubstituted monovalent hydrocarbon group having 1 to 10 carbon atoms other than an unsaturated aliphatic hydrocarbon group, said linear diorganopolysiloxane having an average degree of polymerization of 4 to 50, and
   (5) platinum or a platinum compound.

2. The composition of claim 1 which comprises
   100 parts by weight of diorganopolysiloxane (1),
   an amount of organohydrogenpolysiloxane (2) to provide 0.5 to 4 hydrogen atoms attached to a silicon atom per one of the alkenyl groups present in the overall composition,
   10 to 50 parts by weight of silica (3),
   0.1 to 20 parts by weight of cyclic diorganopolysiloxane (4-1), and
   a catalytic amount of platinum (5).

3. The composition of claim 1 which comprises
   100 parts by weight of diorganopolysiloxane (1),
   an amount of organohydrogenpolysiloxane (2) to provide 0.5 to 4 hydrogen atoms attached to a silicon atom per one of the alkenyl groups present in the overall composition,
   10 to 50 parts by weight of silica (3),
   1 to 20 parts by weight of linear diorganopolysiloxane (4-2), and
   a catalytic amount of platinum (5).

4. The composition of any one of claims 1 to 3 wherein the lower alkenyl group is selected from the class consisting of vinyl, allyl, and propenyl groups.

5. A cured product obtained by curing the composition of claim 1.

* * * * *